United States Patent [19]

Yarnell

[11] Patent Number: 4,848,964
[45] Date of Patent: Jul. 18, 1989

[54] APPARATUS FOR CORRECTING IRREGULARITIES IN OR ENLARGING AN UNDERGROUND DUCT

[75] Inventor: Ian R. Yarnell, Haslemere, England

[73] Assignee: I.P.D. Systems Limited, Guernsey, Channel Islands

[21] Appl. No.: 152,097
[22] PCT Filed: May 15, 1987
[86] PCT No.: PCT/GB87/00335
§ 371 Date: Mar. 18, 1988
§ 102(e) Date: Mar. 18, 1988
[87] PCT Pub. No.: WO87/07322
PCT Pub. Date: Dec. 3, 1987

[30] Foreign Application Priority Data

May 23, 1986 [GB] United Kingdom ............... 8612654

[51] Int. Cl.$^4$ ............................................ F16L 55/18
[52] U.S. Cl. .................................. 405/154; 405/303; 405/156
[58] Field of Search .............. 405/154, 156, 142, 141, 405/144, 145; 72/370, 399, 393; 138/97

[56] References Cited
U.S. PATENT DOCUMENTS 4,063,425 12/1977 Jutte et al. .................. 405/145
4,487,052 12/1984 Yarnell .................. 72/370 X
4,693,404 9/1987 Wayman et al. ............... 405/156 X Primary Examiner—Dennis L. Taylor
Attorney, Agent, or Firm—Hale and Dorr

[57] ABSTRACT

Apparatus for enlarging or removing irregularities in an underground duct comprises first and second expandable segmented nose and intermediate shell portions (10,20) each comprising a respective set of shell parts (14,18) arranged around a longitudinal axis (16). The shell parts (14) of the nose portion (10) are pivotally connected to a nose cone (12) and to the front ends of the shell parts (18), while the shell parts (18) are pivotally connected at their rear ends to a rear pivot assembly (22). Expansion of the duct is achieved by repeatedly driving the joints between the shell parts (14) of the nose portion (10) and the shell parts (18) of the intermediate portion (20) outwards so as to force the wall of the duct outwards, returning the shell parts (14,18) to a contracted configuration, and moving the apparatus forward in the duct. Ingress of loose particles of material from the duct wall into the apparatus is reduced by arranging for the shell parts (14,18) of each portion to be overlapping, each shell part having a recessed border surface (34,64) over which the edge of a neighboring shell part slides.

4 Claims, 3 Drawing Sheets

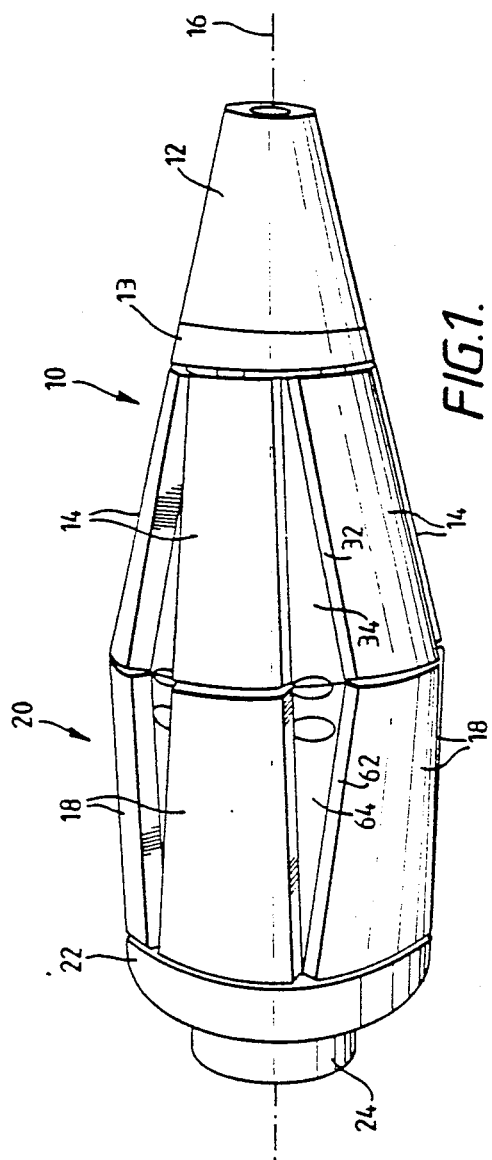
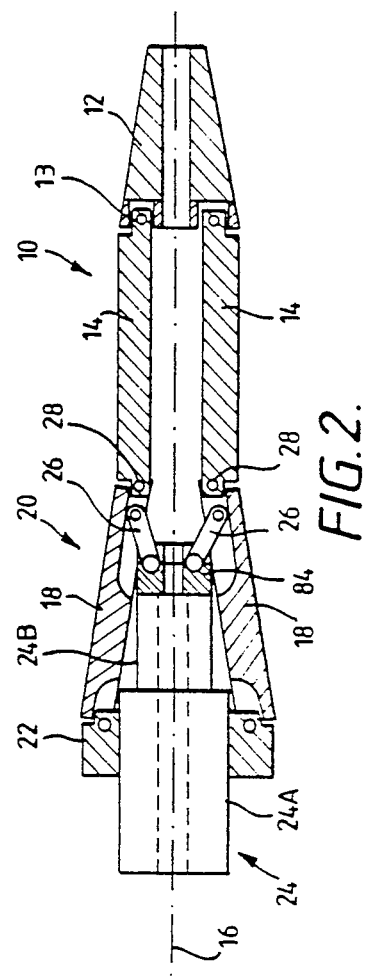
FIG. 1.
FIG. 2.

APPARATUS FOR CORRECTING IRREGULARITIES IN OR ENLARGING AN UNDERGROUND DUCT

This invention relates to apparatus for correcting irregularities in or enlarging an underground duct.

Such apparatus is disclosed in British patent specification No. 2151325A. The known apparatus has a segmented outer shell comprising a segmented nose portion formed by a first set of shell parts, a segmented intermediate portion formed by a second set of shell parts, and a rear portion for attachment to a replacement lining pipe which is drawn through the duct behind the apparatus. Each set of shell parts is arranged symmetrically around a central longitudinal axis of the apparatus with each shell part pivotally connected at each of its ends, the front ends of the nose portion shell parts being connected to a common base element, the rear ends of the nose portion shell parts being connected to the front ends of the intermediate portion shell parts and to an internal expansion device, and the rear ends of the intermediate portion shell parts being connected to the perimeter of the rear portion. In a retracted configuration of the shell parts, the nose portion constitutes a cylindrical shell of a diameter smaller than the internal diameter of the duct to be entered, whilst the intermediate portion is approximately conical, the rear ends of its shell parts defining a larger diameter, substantially equal to the required diameter of the duct. Operation of the expansion device, typically a longitudinally mounted hydraulic ram coupled to connecting rods which act on the pivotal connection between the nose portion shell parts and the intermediate portion shell parts, causes the nose portion to expand to form a segmented approximately conical outer envelope corresponding in shape to the initial shape of the intermediate portion, while the intermediate portion is expanded to form a segmented cylinder of the said larger diameter. The expansion forces the walls of the duct outwards, and on retraction of the shell parts the apparatus can move forwards into the void it has created to carry out the same expansion and retraction cycle on a subsequent portion of the duct. The disclosure of the above mentioned Patent Specification is incorporated in the present specification by reference.

A difficulty encountered with the known apparatus is the entry of material from the wall of the duct into the interior of the shell by passage through the gaps which exist between the shell parts when they are in their expanded configuration. This happens mainly in ducts having walls formed from particles or pieces which do not adhere to each other when the device is expanded, and which then fall into the interior space of the apparatus and retraction mechanism. The present invention largely avoids this difficulty by arranging for those shell parts which lie side by side to overlap each other. In a preferred construction, this is achieved by providing each shell part with an outwardly facing, longitudinally extending border surface along one of its sides, this surface being located so as to be nearer the longitudinal axis of the apparatus than the outer surface of the shell part, thereby allowing an edge portion of the neighbouring shell part to overlap the border surface. In apparatus in accordance with the invention having segmented nose and intermediate portions, each shell part of each portion overlaps a shell part on one of its sides and is overlapped by the shell part on the other of its sides. In this way, as the nose and intermediate portions are expanded and retracted, the spaces enclosed by the shell parts can be largely sealed off from the outside so that no particles or pieces of a size sufficient to interfere with the internal mechanism can enter.

The preferred embodiment of the invention has shell parts in which each of the outwardly facing border surfaces is planar and, in a transverse cross-section at right angles to the longitudinal axis of the apparatus is at an angle to the pivot axes of the pivotal connections of its respective shell part, the angle being equal to one half of the angular spacing of the shell parts at the longitudinal axis of the apparatus. Thus, if the apparatus has a nose portion with six shell parts, the angular spacing at the longitudinal axis is 60°, and the border surface of each shell part is at 30° to the pivot axes of that shell part. This means that at at least one point in the expansion movement of the shell parts, the border surfaces will, in a cross-sectional plane perpendicular to the longitudinal axis of the apparatus be perpendicular to respective radial longitudinal planes passing through the longitudinal axis and the intersection of the pivot axes of the respective pair of shell parts.

Each overlapping edge portion of the shell parts of the preferred embodiment has an edge which engages the underlying border surface of the neighbouring shell part along an engagement line which moves across the border surface during the expansion and retraction cycle. This edge may form the outer boundary of an inwardly facing planar covering surface also at an angle to the pivot axes of its shell part, this angle again being one half of the angular spacing of the shell parts at the longitudinal axis of the apparatus so that the covering surface lies in face-to-face contact with the border surface beneath when the shell parts are in a cylindrical configuration. At other times the border surface is engaged only by the said edge.

The invention will now be described by way of example with reference to the drawings in which FIG. 1 is a perspective view of a duct enlarging device in accordance with the invention;

FIG. 2 is a partly sectioned diagrammatic side view of the device of FIG. 1;

Figure 3:
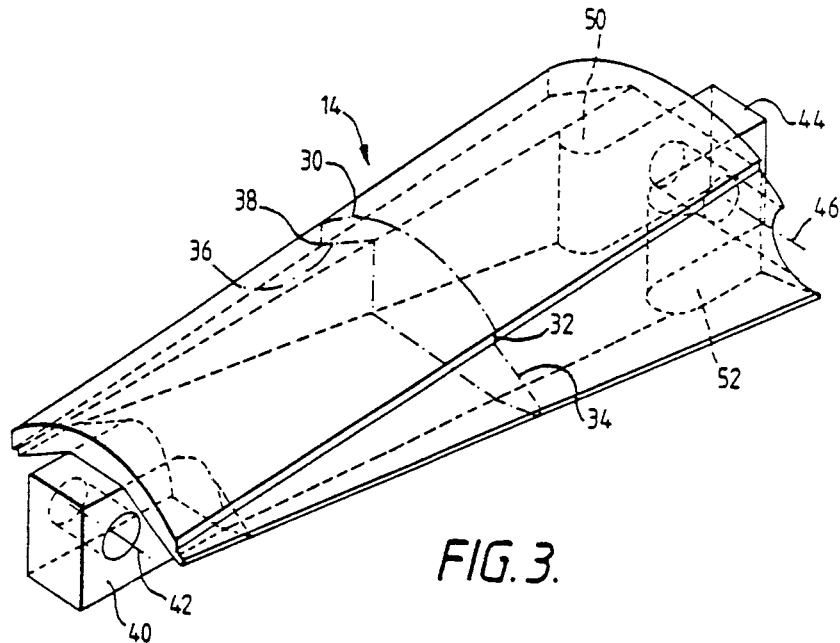
FIG. 3 is a perspective view of a shell part of a nose portion of the device.

Referring to FIGS. 1 and 2 a device in accordance with the invention has an expandable segmented nose portion 10 with a conical front portion 12 which contains a front pivot assembly 13. The nose portion 10, in addition to the end portion 12, has a set of six shell parts 14 forming a first shell portion, the shell parts being pivotally attached to the front end portion 12 by the front pivot assembly 13 and arranged symmetrically around the longitudinal axis 16 of the device.

The rear ends of the shell parts 14 are pivotally coupled to the front ends of a second set of shell parts 18 also arranged around the longitudinal axis 16 to form an expandable segmented intermediate portion 20 of the device. These shell parts of the intermediate portion are, in turn, pivotally connected at the rear ends to a rear pivot assembly 22 forming a rear portion of the device.

Since the shell diameter defined by the pivotal connection at the rear pivot assembly is larger than the shell diameter defined by the front pivot assembly, the shell parts can be driven from a contracted configuration as shown in FIG. 2 in which the nose portion 10 and intermediate portion 20 are respectively cylindrical and conical, to an expanded configuration in which they are respectively conical and cylindrical. It will be appreciated that if the device is located with its front half in a duct of a diameter corresponding to the diameter defined by the nose portion shell parts 14 in their contracted configuration, driving the shell parts to their expanded configuration will force the wall of the duct out to a conical shape which matches the conical shape of the intermediate portion 20 in the contracted configuration. Thus, on returning the shell parts to the contracted configuration, the device can be moved forward with relatively little effort into the void created by the expansion step.

Driving the shell parts into their expanded configuration is performed in the preferred embodiment by a longitudinal located ram 24 having its cylinder part 24A secured in the rear pivot assembly 22 and its piston 24B (FIG. 2) coupled by pivoting connecting rods 26 to the shell parts adjacent the pivotal joints 28 between the shell parts of the intermediate portion 20 and the nose portion 10.

In use the device is operable in the manner described in British Patent Specification No. 2151325A with lining pipe sections attached to the rear portion 22 of the device and, if required, a chain or hawser running through a central longitudinal passage of the device along the longitudinal axis 16 to connect a winch ahead of the device to the rearmost section of a series of pipe section forming the lining pipe which is moved into the duct behind the device as it travels along the duct.

To reduce the amount of loose material from the wall of the duct entering the internal mechanism of the device, each shell part 14 or 18 overlaps an adjacent shell part of the same set. To this end, referring to FIG. 3, each shell part 14 of the nose portion 10 has a curved outer surface 30 which is tapered towards a front end and which is bounded along one edge by a step 32. The step 32 defines one edge of an outwardly facing planar, tapered border surface 34 located inwardly of or beneath the notional extension of the curved surface 30 on one side of the shell part. On the other side of the shell part 14 there is a planar, tapered inwardly facing covering surface 36 formed by a cut-out running the length of the shell part, which surface terminates at a side edge 38.

The front end of the shell part has a connection lug 40 with a transverse bore defining a front pivot axis 42 for connection of the member to a central boss (not shown) at the extreme front end of the device. A similar connection lug 44 extends from the rear end of the member, and also has a transverse bore defining another pivot axis 46 for pivotal connection of the member to a pair of lugs extending from the front end of a shell part of the intermediate portion, as will be described below with reference to FIG. 4. The lugs of the intermediate portion shell part to the rear extend into pockets 50, 52 formed in the body of the nose portion shell part 14, the pockets being shown by dotted lines in FIG. 3.

Figure 4:
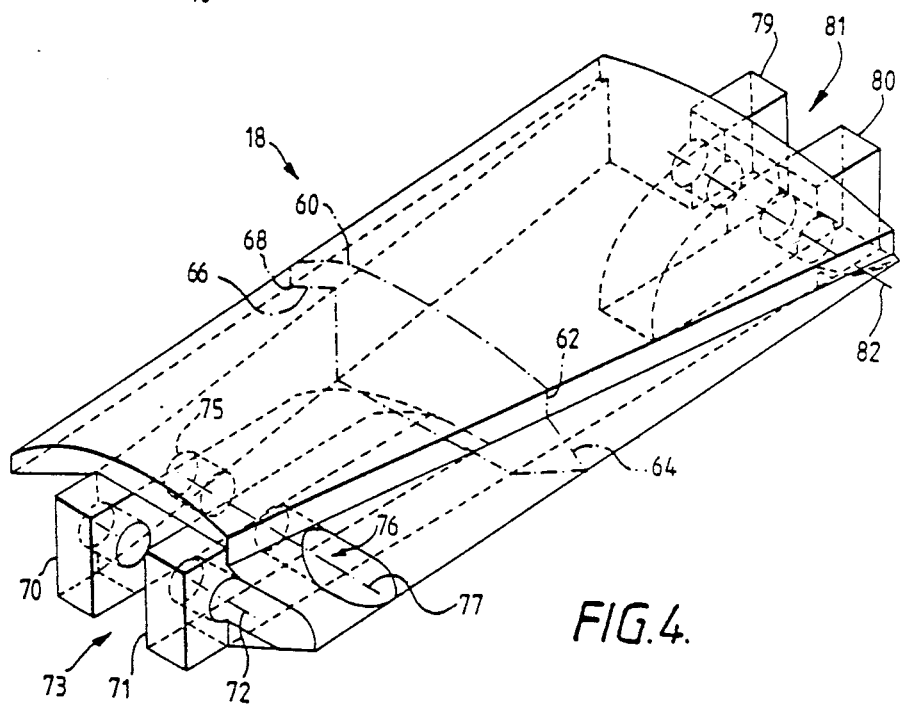
FIG. 4 is a similar perspective view of a shell part of an intermediate portion of the device.

In FIG. 3, the chain line represents a cross-section through the shell part 14, and the longitudinally extending surfaces referred to above are indicated by lead lines extending to the chain line. It will be seen that the border surface 34 and covering surface 36 are at an angle to the pivot axes 42 and 46 so that when several shell parts (in this case six) are assembled in the device to form a nose portion, the covering surface 36 overlies the border surface 34 of a neighbouring shell part, and, when the nose portion is in its retracted, cylindrical configuration, the two surfaces are in face-to-face contact. At other times only the edge 38 touches the border surface 34 of the neighbouring shell part. In this example, the angle of the covering and border surfaces 36 and 34 with respect to the pivot axes 42 and 46 is 30° when viewed in a plane perpendicular to the curved surface 30. Referring now to FIG. 4, the arrangement of the surfaces of the intermediate portion shell part 18 is similar to that of the surfaces of the nose portion shell part 14. The shell part 18 shown in FIG. 4 has a forwardly tapered outer surface 60, a step 62, a rearwardly tapered border surface, a rearwardly tapered covering surface 66 and a side edge 68.

A pair of forward lugs 70, 71 extend from a front end of the shell part 18 and are drilled to define a pivot axis 72 which, in the assembled device coincides with the pivot axis 46 (see FIG. 3) defined by the bore drilled in the rear lug 44 of the corresponding nose portion shell part.

A elongate pocket 73 extends between the lugs 70, 71 and into the body of the shell part 18 to receive not only the lug 44 of the nose portion shell part, but also the end of a connecting rod 26 (FIG. 2) forming part of the expansion mechanism. This connecting rod is pivotally attached to the shell part by a pin (also not shown) passing through a further pair of holes 75, 76 which define a second axis 77.

At the other end of the shell part there is a pair of rearwardly extending rear lugs 79, 80 with a pocket 81 between them for receiving a lug on the rear portion 22 (FIGS. 1 and 2) of the device. Again, the lugs 79, 80 are drilled to define a rear pivot axis 82 about which the shell part pivots relative to the rear portion of the device.

Figure 5:
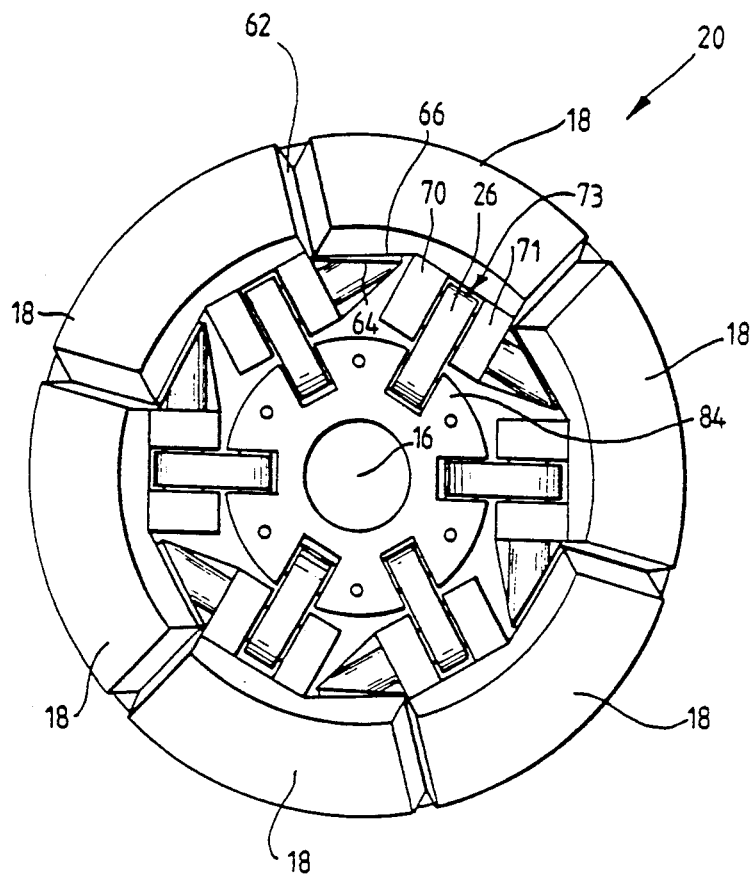
FIG. 5 is a diagrammatic end elevation of the intermediate portion of the device with the nose portion detached looking towards the rear of the device.

Referring to FIG. 5 in conjunction with FIG. 4, in the preferred embodiment, the shell part 18 is one of six identical shell parts 18 constituting the intermediate portion 20 of the device, the members being arranged symmetrically around the central longitudinal axis of the device, each shell part 18 having its covering surface 66 overlapping the border surface 64 of a neighbouring shell part, as shown in the front view of the intermediate portion in FIG. 5 the connection rods 26, pivotally connected to the front ends of the shell parts 18 in their pockets 73 have their other ends coupled to a piston pivot assembly 84 (See also FIG. 2) attached to the end of the ram piston 24B. On each shell part on each nose portion member, the covering surface 66 and border surface 64 are at substantially 30° to the pivot axes 72 and 82 when viewed in end elevation, i.e. viewing a cross-sectional plane perpendicular to the surface 60 and parallel to the pivot axes. In the expanded configuration of the intermediate portion shell parts 18, the border surfaces 64 and covering surfaces 66 are in substantial face-to-face contact, while in the retracted configuration and the intermediate configuration, only the edges 68 engage the border surfaces 64 of the neighbouring shell parts 18.

It will be appreciated that, for the interior of a device in accordance with the invention to be closed off from the outside to prevent ingress of loose material, edge contact only of the shell parts is necessary. Face-to-face contact is not essential, and planar covering surface 66 can be of any configuration provided there is clearance over the underlying border surface.

It is possible to construct a device with only one set of shell parts, which, although not as versatile as a device with two sets of shell parts, is able to modify underground ducts in many situations. In addition, the overlapping shell parts need not be pivoted but may execute a simple translational movement radially of the longitudinal axis of the device.

I claim:

1. Apparatus for travelling through an underground duct and for removing irregularities in or enlarging the duct, wherein the apparatus comprises two sets of expandable segmented shell portions arranged one in front of the other along a longitudinal axis of the apparatus, the shell parts being arranged around the longitudinal axis and having respective outwardly facing outer surface portions for engaging the sides of the duct, the shell parts being movable laterally with respect to the longitudinal axis from a contracted configuration to an expanded configuration for forcing the sides of the duct away from the axis, the shell parts of the first set being each pivotally connected at front ends thereof to a front pivot assembly to define a first shell diameter and the shell parts of the first set being pivotally connected at rear ends thereof to front ends of respective shell parts of the second set, the shell parts of the second set being each pivotally connected to a rear pivot assembly to define a second, larger shell diameter, the shell parts of each set overlapping each other along their full length so as to enclose an internal space throughout the pivotal movement of the shell parts between the contracted configuration and the expanded configuration.

2. Apparatus according the claim 1, wherein each shell part includes an outwardly facing, longitudinally extending border surface along a side of the shell part, said border surface being located generally nearer the longitudinal axis of the apparatus than the said outer surface portion of the shell part and beneath an edge portion of an overlying adjacent shell part.

3. Apparatus according to claim 2, wherein an edge portion of the overlying shell part is in continuous contact with the said border surface throughout the movement of the shell parts between their contracted and expanded configuration.

4. A method of removing irregularities in or enlarging an underground duct using apparatus for travelling through an underground duct and for removing irregularities in or enlarging the duct, wherein the apparatus comprises two sets of expandable segmented shell portions arranged one in front of the other along a longitudinal axis of the apparatus, the shell parts being arranged around the longitudinal axis and having respective outwardly facing outer surface portions for engaging the sides of the duct, the shell parts being movable laterally with respect to the longitudinal axis from a contracted configuration to an expanded configuration for forcing the sides of the duct away from the axis, the shell parts of the first set being each pivotally connected at front ends thereof to a front pivot assembly to define a first shell diameter, the shell parts of the first set being pivotally connected at rear ends thereof to front ends of respective shell parts of the second set, the shell parts of the second set being each pivotally connected to a rear pivot assembly to define a second, larger shell diameter, the shell parts of each set overlapping each other along their full length so as to enclose an internal space throughout the pivotal movement of the shell parts between the contracted configuration and the expanded configuration, said method comprising the steps of:

placing the apparatus in the duct in a contracted configuration, driving the shell parts into their expanded configuration to create an expanded duct portion, returning the shell parts to their contracted configuration, causing the apparatus to move forwardly into the expanded duct portion, and repeating the said driving, returning and moving steps to traverse a required length of a duct.

* * * * *